US010528251B2

(12) United States Patent
Ekambaram et al.

(10) Patent No.: US 10,528,251 B2
(45) Date of Patent: Jan. 7, 2020

(54) ALTERNATE VIDEO SUMMARIZATION

(71) Applicant: INTERNATIONAL BUSINESS MACHINES CORPORATION, Armonk, NY (US)

(72) Inventors: Vijay Ekambaram, Chennai (IN); Sarbajit K. Rakshit, Kolkata (IN)

( * ) Notice: Subject to any disclaimer, the term of this patent is extended or adjusted under 35 U.S.C. 154(b) by 178 days.

(21) Appl. No.: 15/376,861

(22) Filed: Dec. 13, 2016

(65) Prior Publication Data

US 2018/0165000 A1  Jun. 14, 2018

(51) Int. Cl.
| | |
|---|---|
| G06F 3/048 | (2013.01) |
| G06F 3/0488 | (2013.01) |
| G11B 27/34 | (2006.01) |
| G11B 27/10 | (2006.01) |
| G06F 3/0484 | (2013.01) |

(52) U.S. Cl.
CPC ........ *G06F 3/04883* (2013.01); *G11B 27/105* (2013.01); *G11B 27/34* (2013.01); *G06F 3/0488* (2013.01); *G06F 3/04847* (2013.01); *G06F 3/04886* (2013.01)

(58) Field of Classification Search
CPC ........ G06F 17/30849; G06F 17/30017; G06K 9/00711; H04N 21/4722; H04N 21/4622; H04N 21/8456
USPC ................................................ 715/719, 720
See application file for complete search history.

(56) References Cited

U.S. PATENT DOCUMENTS

| | | | |
|---|---|---|---|
| 7,773,813 B2 | 8/2010 | Hua et al. | |
| 2008/0165141 A1* | 7/2008 | Christie | G06F 3/044 |
| | | | 345/173 |
| 2008/0270569 A1 | 10/2008 | McBride et al. | |
| 2012/0274662 A1* | 11/2012 | Kim | G06F 3/0488 |
| | | | 345/650 |
| 2014/0282660 A1* | 9/2014 | Oztaskent | H04N 21/4828 |
| | | | 725/18 |

(Continued)

FOREIGN PATENT DOCUMENTS

WO      2005072239      8/2005

OTHER PUBLICATIONS

Wang, Tao et al.; Video Summarization by Redundancy Removing and Content Ranking; Chapter 6—Computer Vision for Multimedia Applications: Methods and Solutions; Information Science Reference; 2011; 13 pages.

(Continued)

*Primary Examiner* — Alex Olshannikov
(74) *Attorney, Agent, or Firm* — Schmeiser, Olsen & Watts; Mark C. Vallone

(57) ABSTRACT

A method and system for improving video summary visualization is provided. The method includes detecting via a touch screen display of a hardware device, user contact with a specified portion of a progress bar of a video file being presented via the touch screen display. In response, an amount of pressure being applied via the user contact is detected and an associated portion of the video file associated with the specified portion of the progress bar is identified. A menu for selecting specified attributes of the portion of the video file is presented based on the amount of pressure being applied and a selection for an attribute is received via the menu. A thumbnail image associated with the attribute is presented via the touch screen display.

18 Claims, 5 Drawing Sheets

(56) References Cited

U.S. PATENT DOCUMENTS

| | | | |
|---|---|---|---|
| 2014/0324837 A1* | 10/2014 | Byers | G06F 17/30796 |
| | | | 707/722 |
| 2015/0058723 A1* | 2/2015 | Cieplinski | G06F 3/04855 |
| | | | 715/702 |
| 2015/0199116 A1 | 7/2015 | Bloch et al. | |
| 2015/0296250 A1* | 10/2015 | Casper | H04N 21/4316 |
| | | | 725/34 |
| 2015/0373299 A1 | 12/2015 | Kritt et al. | |
| 2017/0336961 A1* | 11/2017 | Heo | G06F 3/04817 |

OTHER PUBLICATIONS

Bojanowski, P., et al.; Finding Actors and Actions in Movies; IEEE International Conference on Computer Vision; Dec. 1-8, 2013; 8 pages.

Li, Ying et al.; Movie Content Analysis, Indexing and Skimming Via Multimodal Information—Chapter 5; Video Mining (A Rosenfeld et al. (eds.)); 2003; pp. 123-154.

Chen, Lei et al.; Rule-Based Scene Extraction from Video; 2002 International Conference on Image Processing; Sep. 22-25, 2002; 4 pages.

Xu, Min; Hierarchical Movie Affective Content Analysis Based on Arousal and Valence Features; 16th ACM International Conference on Multimedia; Oct. 26-31, 2008; pp. 677-680.

Sivic, Josef et al.; Efficient Visual Search for Objects in Videos; Proceedings of the IEEE; vol. 96, No. 4; Apr. 2008; pp. 548-566.

Xu, Min et al.; Affective Content Analysis in Comedy and Horror Videos by Audio Emotional Event Detection; 2005 IEEE International Conference on Multimedia and Expo; Jul. 6-8, 2005; 4 pages.

Android-er; Get touch pressure; http://android-er.blogspot.in/2014/05/get-touch-pressure.html; May 16, 2014; 6 pages.

* cited by examiner

ALTERNATE VIDEO SUMMARIZATION

FIELD

The present invention relates generally to a method for presenting a visual summarization associated with a portion of a video file and in particular to a method and associated system for improving visual summarization by providing alternative summarization attributes for selection.

BACKGROUND

Accurately identifying portions of visual data for presentation typically includes an inaccurate process with little flexibility. Switching between various video portions with respect to selecting accurate video for viewing may include a complicated process that may be time consuming and require a large amount of resources. Accordingly, there exists a need in the art to overcome at least some of the deficiencies and limitations described herein above.

SUMMARY

A first aspect of the invention provides a video summary visualization improvement method comprising: detecting via a touch screen display, by a processor of a hardware device comprising the touch screen display, user contact with a specified portion of a progress bar of a video file being presented via the touch screen display; detecting via the touch screen display, by the processor, an amount of pressure being applied via the user contact with the specified portion of the progress bar; identifying, by the processor based on the amount of pressure being applied, a portion of the video file associated with the specified portion of the progress bar; presenting based on the amount of pressure being applied and the portion of the video file, by the processor to the user via the touch screen display, a menu for selecting specified attributes of the portion of the video file; receiving, by the processor from the user via the menu, a selection for a first attribute of the specified attributes; and presenting, by the processor to the user via the touch screen display, a thumbnail image associated with the first attribute.

A second aspect of the invention provides a computer program product, comprising a computer readable hardware storage device storing a computer readable program code, the computer readable program code comprising an algorithm that when executed by a processor of a hardware device comprising a touch screen display implements a video summary visualization improvement method, the method comprising: detecting via the touch screen display, by the processor, user contact with a specified portion of a progress bar of a video file being presented via the touch screen display; detecting via the touch screen display, by the processor, an amount of pressure being applied via the user contact with the specified portion of the progress bar; identifying, by the processor based on the amount of pressure being applied, a portion of the video file associated with the specified portion of the progress bar; presenting based on the amount of pressure being applied and the portion of the video file, by the processor to the user via the touch screen display, a menu for selecting specified attributes of the portion of the video file; receiving, by the processor from the user via the menu, a selection for a first attribute of the specified attributes; and presenting, by the processor to the user via the touch screen display, a thumbnail image associated with the first attribute.

A third aspect of the invention provides a hardware device comprising a touch screen display and a computer processor coupled to a computer-readable memory unit, the memory unit comprising instructions that when executed by the computer processor implements a video summary visualization improvement method comprising: detecting via the touch screen display, by the processor, user contact with a specified portion of a progress bar of a video file being presented via the touch screen display; detecting via the touch screen display, by the processor, an amount of pressure being applied via the user contact with the specified portion of the progress bar; identifying, by the processor based on the amount of pressure being applied, a portion of the video file associated with the specified portion of the progress bar; presenting based on the amount of pressure being applied and the portion of the video file, by the processor to the user via the touch screen display, a menu for selecting specified attributes of the portion of the video file; receiving, by the processor from the user via the menu, a selection for a first attribute of the specified attributes; and presenting, by the processor to the user via the touch screen display, a thumbnail image associated with the first attribute.

The present invention advantageously provides a simple method and associated system capable of accurately identifying visual data for presentation.

DETAILED DESCRIPTION

Figure 1:
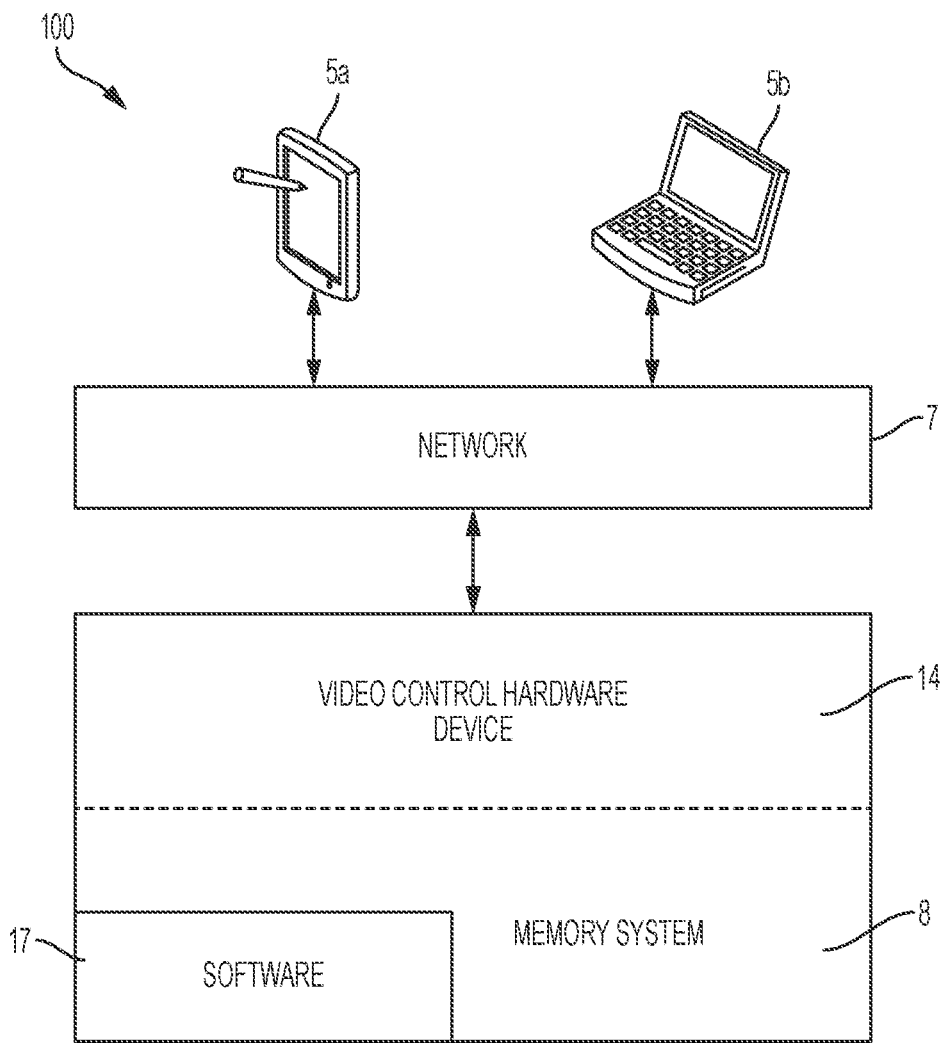
FIG. 1 illustrates a system for generating a detailed visual thumbnail summarization for a portion of a video file for improving video file presentation technology, in accordance with embodiments of the present invention.

FIG. 1 illustrates a system 100 for generating a detailed visual thumbnail summarization for a portion of a video file for improving video file presentation technology, in accordance with embodiments of the present invention. System 100 enables a user based video summary generation method by stitching multiple thumbnails for a portion of a video file such that a video summary may include a graphical visualization, key characters, associated audio, captions, etc. associated with a selected video portion. System 100 allows a process for dynamically selecting and/or adjusting a portion of a video file based on gesture, pressure, and/or force being applied by a user with respect to a progress bar. In response, information such as a summary for a selected video portion (e.g., a graphical visualization, key characters, audio, captions, etc.) may be presented to the user.

System 100 of FIG. 1 includes hardware devices 5a and 5b connected through a network 7 to a video control hardware device 14. Hardware devices 5a and 5b and video control hardware device 14 each may comprise an embedded mobile device. An embedded mobile device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware devices 5a and 5b and video control hardware device 14 may each comprise a specialized hardware device comprising specialized (non-generic) hardware and circuitry (i.e., specialized discrete non-generic analog, digital, and logic based circuitry) for (independently or in combination) executing a process described with respect to FIGS. 1-4. The specialized discrete non-generic analog, digital, and logic based circuitry may include proprietary specially designed components (e.g., a specialized integrated circuit, such as for example an Application Specific Integrated Circuit (ASIC) designed for only implementing an automated process for generating a detailed visual thumbnail summarization for a portion of a video file for improving video file selection technology. Video control hardware device 14 includes a memory system 8 and software 17. Hardware devices 5a and 5b and video control hardware device 14 may comprise mobile devices such, inter alia, as smart phones, pagers, IOT devices, etc. Alternatively, hardware devices 5a and 5b and video control hardware device 14 may each comprise an embedded hardware device such as, inter alia, a controller, a computer, etc. The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

System 100 is configured to execute a process for dynamically generating a detailed visual thumbnail summarization for a portion of a video file such that:

1. A user may dynamically modify a dimension for a mouse head area and accordingly a video portion may be selected from a video progress bar.
2. A dimension for a cursor head area may be dynamically modified based on:
   A. An applied force and/or pressure with respect to a touched (via a user) portion of a touch screen display.
   B. Usage of multiple user fingers (or any body portions) to define a boundary.
3. A user may visualize various information from a selected portion via a mouse hovering over a video progress bar. Therefore, a user may have an option for selecting a type of information to be displayed with respect to a video progress bar. For example:
   A. A graphical visualization of a video summary for a selected video portion of a video file.
   B. Key characters for a selected video portion of a video file (e.g., various faces presented in the video portion).
   C. Audio portions associated with a selected video portion.
   D. Captions in a video portion.
4. A user may view stitched video frames based in a selected video portion. For example, system 100 may stitch associated video frames to illustrate content of a selected video portion.

Therefore, system 100 provides a thumbnail based real-time graphical summary rendering of a video file with respect to time. Additionally, dimensions of a graphical thumbnail summary may be controlled by a pressure, gesture, and/or force applied by a user with respect to an interaction system (e.g., a mouse, a keyboard, etc.) of a touch screen display. In response, a user may hover (via a video progress bar) a timeline of a video file to view a graphical thumbnail summary at various points in time.

System 100 further enables a boundary based graphical summary thumbnail rendering within video file such that a boundary of a video portion (of a video file) is intuitively selected based on a pressure of a user finger with respect to a touch screen display (e.g., a duration of pressure further extends a boundary with respect to a finger position). In response, a graphical summary thumbnail is generated with respect to a selected video portion (based on the boundary) by stitching (together) a graphical summary of all the video frames in a selected video portion.

The following implementation example describes a process for displaying selected video content associated information as a thumbnail image:

1. System 100 detects an applied amount of (touch related) pressure (on a touch screen display) and accordingly a portion of a video is selected by a user. If the applied amount of detected pressure is determined to be less than a predetermined threshold, the user is presented with a thumbnail of the portion of the video. If the applied amount of detected pressure is determined to be greater than a predetermined threshold, then a larger portion of the video is highlighted with respect to a progress bar of the video. Based on an amount of applied pressure, system 100 identifies the portion of the video and extracts differing associated information. In response to the applied pressure, a set of menu items associated with the portion of the video are displayed. In response, the user may use a first finger to apply the pressure to a progress bar on the video on the touch screen display and a second finger to select a menu item from the set of menu items. Based on a selected menu item, system 100 overlays associated information over the progress bar on the video. Likewise, a video analysis process is executed to identify facial images, semantic relationships, etc. with respect to the portion of the video and accordingly a menu is presented for user selection. Based on user selection, associated contents are displayed for the user as thumbnail.

Figure 2:
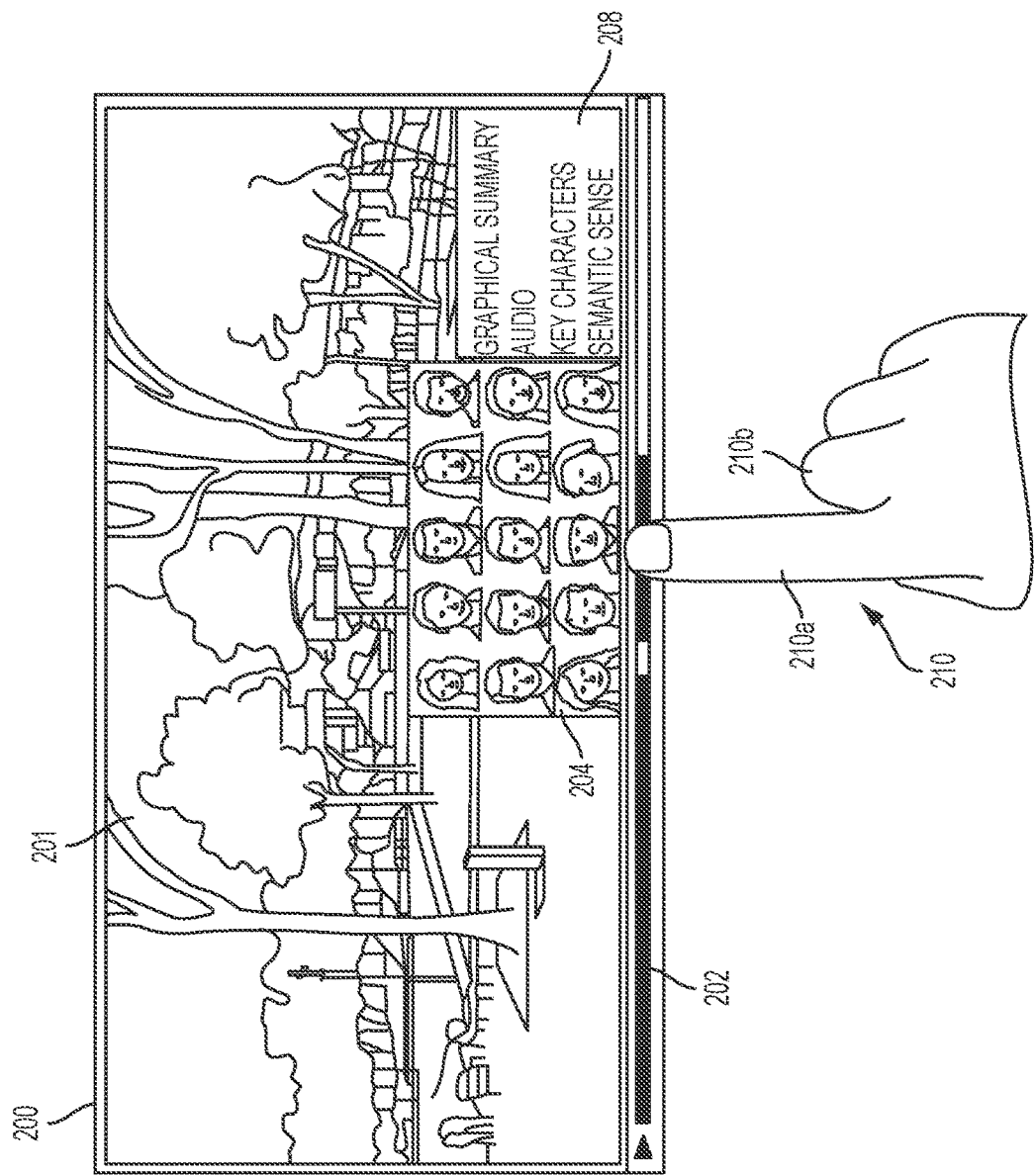
FIG. 2 illustrates a portion of a video file currently being presented via a touch screen display, in accordance with embodiments of the present invention.

FIG. 2 illustrates a portion 201 of a video file currently being presented via touch screen display 200, in accordance with embodiments of the present invention. Touch screen display 200 allows a user 210 to visualize information via a progress bar 202. In response to an amount of applied pressure being applied by user 210 (i.e., a finger 201a of user 210), portion 201 of the video file is selected and accordingly key characters of portion 201 of the video file are displayed via a thumbnail image 204. The key characters may include faces of individuals in the portion 201 of the video file as illustrated in FIG. 2. Additionally, user 210 may use an additional finger 210b to select an option (e.g., a graphical summary, audio, key characters, semantic sense, etc.) from a menu 208 with respect to the key characters or additional options. A first amount of pressure being applied (via finger 210a) may enable user 210 to visualize thumbnail image 204. Likewise, a second amount of pressure being applied (via finger 210a) may enable user 210 to select an additional portion of the video file and view additional information for the additional portion of the video file.

Figure 3:
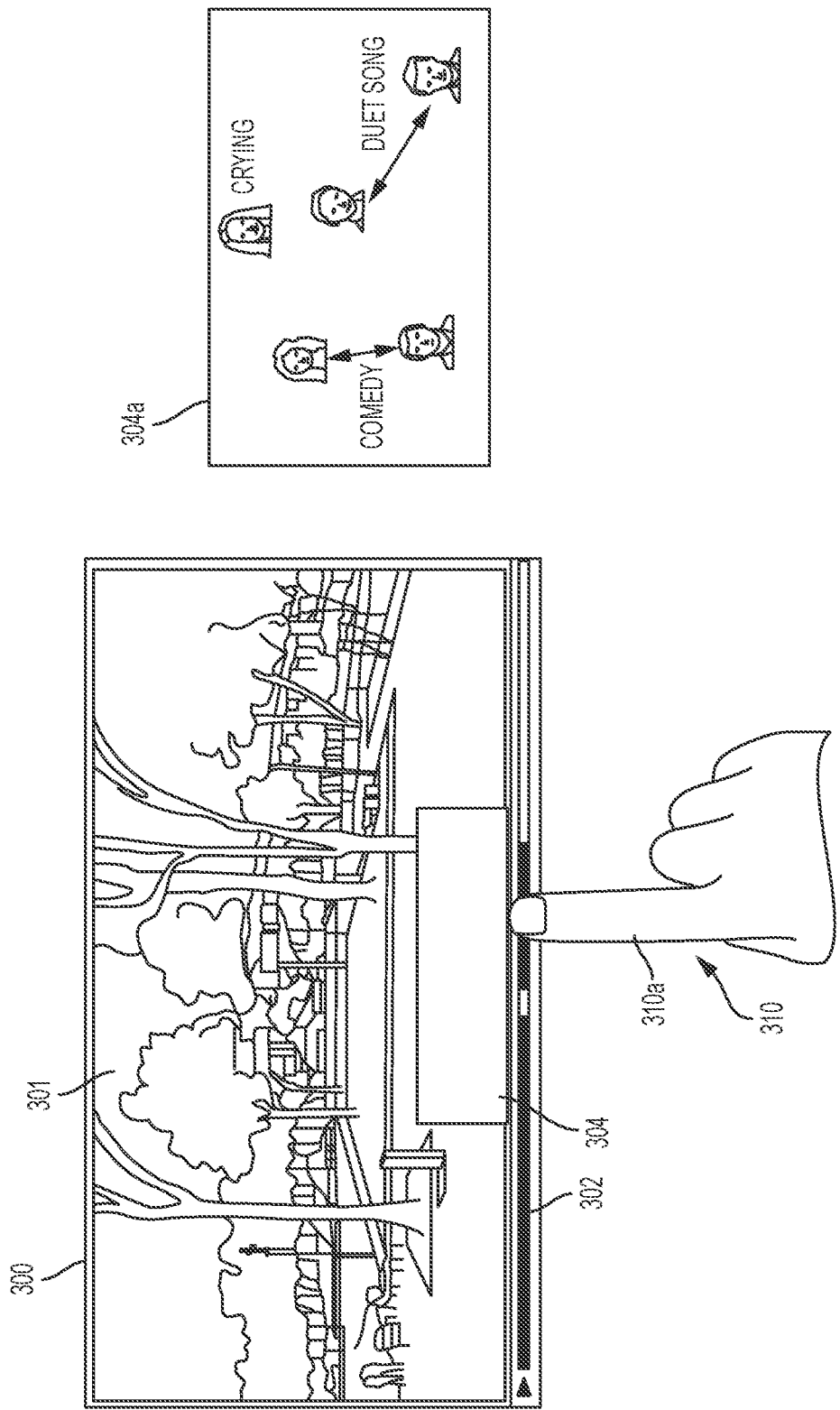
FIG. 3 illustrates an alternative portion of a video file currently being presented via a touch screen display, in accordance with embodiments of the present invention.

FIG. 3 illustrates a portion 301 of a video file currently being presented via touch screen display 300, in accordance with embodiments of the present invention. Touch screen display 300 allows a user 310 to visualize information via a progress bar 302. In response to an amount of applied pressure being by user 310 (i.e., a finger 301a of user 310), portion 301 of the video file is selected and accordingly a dimension of a stitched image 304 is calculated dynamically based on a content present in different frames of portion 301 of the video file. Additionally, user 310 may view the graphical summary 304a of the selected of portion 301 of the video file.

Figure 4:
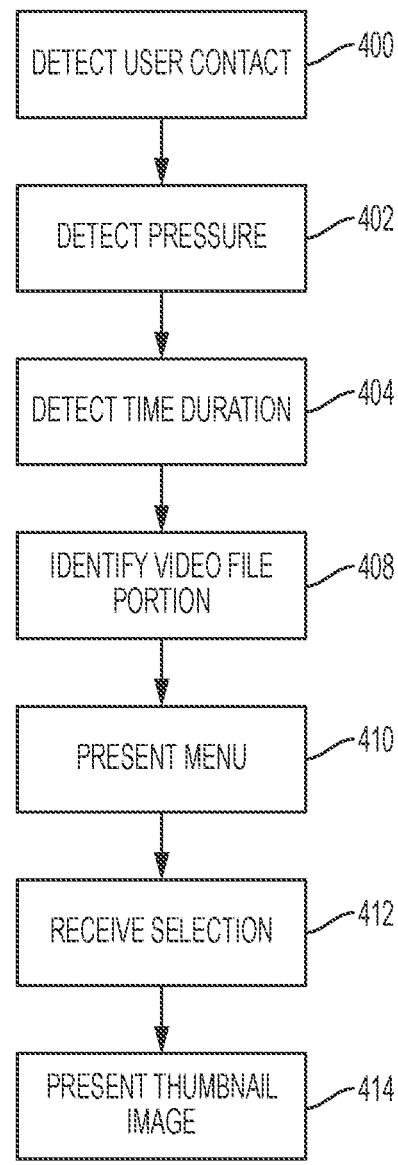
FIG. 4 illustrates an algorithm detailing a process flow enabled by the system of FIG. 1 for generating a detailed visual thumbnail summarization for a portion of a video file for improving video file presentation technology, in accordance with embodiments of the present invention.

FIG. 4 illustrates an algorithm detailing a process flow enabled by system 100 of FIG. 1 for generating a detailed visual thumbnail summarization for a portion of a video file for improving video file presentation technology, in accordance with embodiments of the present invention. Each of the steps in the algorithm of FIG. 4 may be enabled and executed in any order by a computer processor(s) executing computer code. Additionally, each of the steps in the algorithm of FIG. 4 may be enabled and executed independently by video control hardware device 14 or hardware devices 5a and 5b of FIG. 1. Alternatively, each of the steps in the algorithm of FIG. 4 may be enabled and executed in combination by hardware devices 5a and 5b and video control hardware device 14 of FIG. 1. In step 400, user contact with a specified portion of a progress bar of a video file being presented via a touch screen display is detected. In step 402, an amount of pressure being applied via the user contact with the specified portion of the progress bar is detected. In optional step 404, a time duration associated with the amount of pressure being applied via the user contact with the specified portion of the progress bar is detected. In step 408, a portion of the video file associated with the specified portion of the progress bar is identified based on the amount of pressure being applied (detected in step 402) and the optional time duration determined in step 404. In step 410, a menu for selecting specified attributes of the portion of the video file is presented to the user based on the amount of pressure being applied and the portion of the video file. The specified attributes may include, inter alia, a graphical summary of the video file, key characters of the portion of the video file, a visual representation of an audio portion associated with the portion of the video file, captions associated with the portion of the video file, etc. Key characters may include facial images of individuals presented in the portion of the video file. In step 412, a selection for a first attribute of the specified attributes is received from the user via the presented menu. In an example embodiment, the amount of pressure applied in step 402 may be applied via a first finger of the user and the selection for the first attribute may be enabled via usage of a second finger of the user. Additionally, an area located between the first finger and the second finger may define a boundary such that the identification of step 408 is further based on the boundary. In step 414, a thumbnail image associated with the first attribute is presented via the touch screen display. The thumbnail image may be presented adjacent to the progress bar and a point of user contact.

Figure 5:
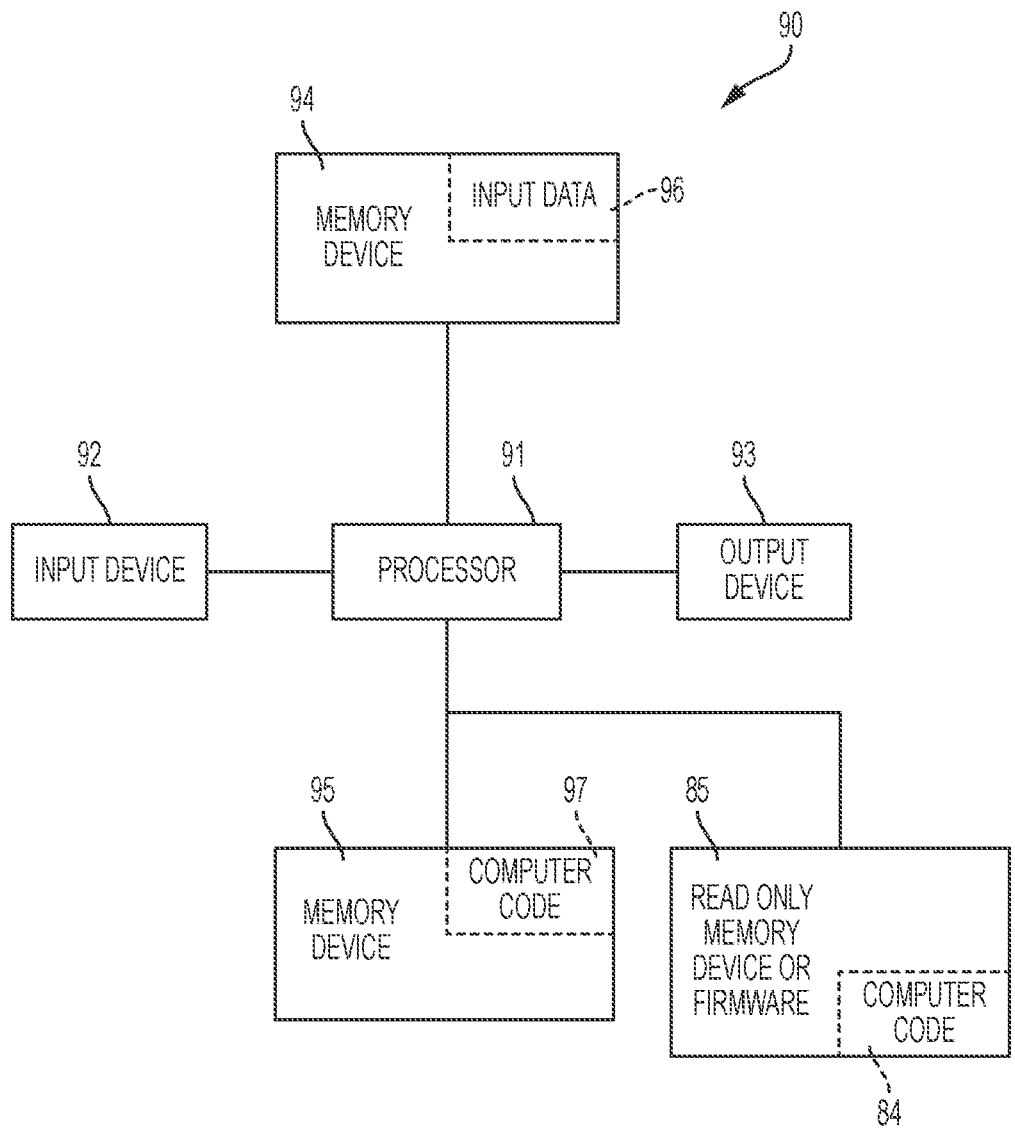
FIG. 5 illustrates a computer system used by the system of FIG. 1 for enabling a process for generating a detailed visual thumbnail summarization for a portion of a video file for improving video file presentation technology, in accordance with embodiments of the present invention.

FIG. 5 illustrates a computer system 90 (e.g., video control hardware device 14 and/or hardware devices 5a and 5b) used by or comprised by the system of FIG. 1 for generating a detailed visual thumbnail summarization for a portion of a video file for improving video file presentation technology, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for generating a detailed visual thumbnail summarization for a portion of a video file for improving video file presentation technology. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 4) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to generate a detailed visual thumbnail summarization for a portion of a video file for improving video file presentation technology. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for generating a detailed visual thumbnail summarization for a portion of a video file for improving video file presentation technology. In another embodiment, the invention provides a business method that performs the process steps of the invention on a subscription, advertising, and/or fee basis. That is, a service supplier, such as a Solution Integrator, could offer to enable a process for generating a detailed visual thumbnail summarization for a portion of a video file for improving video file presentation technology. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A video summary visualization and video file presentation technology improvement method comprising:
    detecting via a touch screen display, by a processor of a hardware device comprising said touch screen display, user contact with a specified portion of a progress bar of a video file being presented via said touch screen display, wherein said hardware device comprises specialized non-generic hardware and analog, digital, and logic based circuitry comprising proprietary specially designed components including a specialized integrated circuit;
    detecting via said touch screen display, by said processor, an amount of pressure being applied via said user contact with said specified portion of said progress bar;
    dynamically modifying, by said processor based on said amount of pressure being applied, a dimension of a cursor of said touch screen display;
    identifying, by said processor based on said dimension of said cursor, a portion of said video file associated with said specified portion of said progress bar;
    detecting, by said processor, a gesture of said user with respect to said hardware device;
    adjusting by said processor based on said gesture, a size of said portion of said video file;
    presenting based on said amount of pressure being applied and said portion of said video file, by said processor to said user via said touch screen display, a menu for selecting specified attributes of said portion of said video file;
    receiving, by said processor from said user via said menu, a selection for a first attribute of said specified attributes;
    overlaying, by said processor, information associated with said first attribute over said progress bar;
    presenting, by said processor to said user via said touch screen display, said information over said progress bar;
    presenting, by said processor to said user via said touch screen display, a thumbnail image associated with said first attribute, wherein said thumbnail image comprises key characters comprising facial images of individuals presented in said portion of said video file;
    stitching, by said processor, said thumbnail image together with a graphical menu summarizing graphical, audible, character, and sematic attributes of said portion of said video file;
    receiving, by said processor from said user via said menu, a selection for a second attribute of said specified attributes; and
    presenting, by said processor via said touch screen display based on said selection of said second attribute, a graphical summary comprising a first facial image of said facial images and an associated common connection to a second facial image of said facial images, wherein said associated common connection comprises audio, video, and semantic based subject matter connections between said first facial image and said second facial image of said portion of said video file, wherein said subject matter connections are presented as a visible connection line extending between said first facial image and said second facial image, and wherein said graphical summary is presented within said touch screen display such that said graphical summary is presented over a portion of said touch screen display that is less than an entire portion of said touch screen display.

2. The method of claim 1, wherein said thumbnail image is presented adjacent to said progress bar and a point of said user contact.

3. The method of claim 1, wherein said amount of pressure is applied to said specified portion of said progress bar via a first finger of said user, and wherein said selection for said first attribute is enabled via usage of a second finger of said user.

4. The method of claim 3, wherein an area located between said first finger and said second finger define a boundary, and wherein said identifying is further based on said boundary.

5. The method of claim 1, wherein said specified attributes further comprise attributes selected from the group consisting of key characters of said portion of said video file, a visual representation of an audio portion associated with said portion of said video file, and captions associated with said portion of said video file.

6. The method of claim 1, further comprising:
    detecting via said touch screen display, by said processor, a time duration associated with said amount of pressure being applied via said user contact with said specified portion of said progress bar, wherein said identifying is further based on said time duration.

7. The method of claim 1, further comprising:
    detecting via said touch screen display, by said processor, a second amount of pressure being applied via said user contact with said specified portion of said progress bar, wherein said second amount of pressure differs from said amount of pressure;
    presenting based on said second amount of pressure being applied, by said processor to said user via said touch screen display, an additional menu for selecting additional specified attributes of said portion of said video file, wherein said additional specified attributes differ from said specified attributes;
    receiving, by said processor from said user via said additional menu, an selection for a second attribute of said additional specified attributes; and
    presenting, by said processor to said user via said touch screen display, a second thumbnail image associated with said second attribute, wherein said second thumbnail image differs from said thumbnail image.

8. The method of claim 1, further comprising:
    providing at least one support service for at least one of creating, integrating, hosting, maintaining, and deploying computer-readable code in the control hardware, said code being executed by the computer processor to implement: said detecting said user content, said detecting said amount of pressure being applied, said identifying, said presenting said menu, said receiving, and said presenting said thumbnail image.

9. A computer program product, comprising a computer readable hardware storage device storing a computer readable program code, said computer readable program code comprising an algorithm that when executed by a processor of a hardware device comprising a touch screen display implements a video summary visualization and video file presentation technology improvement method, said method comprising:

detecting via said touch screen display, by said processor, user contact with a specified portion of a progress bar of a video file being presented via said touch screen display, wherein said hardware device comprises specialized non-generic hardware and analog, digital, and logic based circuitry comprising proprietary specially designed components including a specialized integrated circuit;

detecting via said touch screen display, by said processor, an amount of pressure being applied via said user contact with said specified portion of said progress bar;

dynamically modifying, by said processor based on said amount of pressure being applied, a dimension of a cursor of said touch screen display;

identifying, by said processor based on said dimension of said cursor, a portion of said video file associated with said specified portion of said progress bar;

detecting, by said processor, a gesture of said user with respect to said hardware device;

adjusting by said processor based on said gesture, a size of said portion of said video file;

presenting based on said amount of pressure being applied and said portion of said video file, by said processor to said user via said touch screen display, a menu for selecting specified attributes of said portion of said video file;

receiving, by said processor from said user via said menu, a selection for a first attribute of said specified attributes;

overlaying, by said processor, information associated with said first attribute over said progress bar;

presenting, by said processor to said user via said touch screen display, said information over said progress bar;

presenting, by said processor to said user via said touch screen display, a thumbnail image associated with said first attribute, wherein said thumbnail image comprises key characters comprising facial images of individuals presented in said portion of said video file;

stitching, by said processor, said thumbnail image together with a graphical menu summarizing graphical, audible, character, and sematic attributes of said portion of said video file;

receiving, by said processor from said user via said menu, a selection for a second attribute of said specified attributes; and presenting, by said processor via said touch screen display based on said selection of said second attribute, a graphical summary comprising a first facial image of said facial images and an associated common connection to a second facial image of said facial images, wherein said associated common connection comprises audio, video, and semantic based subject matter connections between said first facial image and said second facial image of said portion of said video file, wherein said subject matter connections are presented as a visible connection line extending between said first facial image and said second facial image, and wherein said graphical summary is presented within said touch screen display such that said graphical summary is presented over a portion of said touch screen display that is less than an entire portion of said touch screen display.

10. The computer program product of claim 9, wherein said thumbnail image is presented adjacent to said progress bar and a point of said user contact.

11. The computer program product of claim 9, wherein said amount of pressure is applied to said specified portion of said progress bar via a first finger of said user, and wherein said selection for said first attribute is enabled via usage of a second finger of said user.

12. The computer program product of claim 11, wherein an area located between said first finger and said second finger define a boundary, and wherein said identifying is further based on said boundary.

13. The computer program product of claim 9, wherein said specified attributes comprise attributes selected from the group consisting of key characters of said portion of said video file, a visual representation of an audio portion associated with said portion of said video file, and captions associated with said portion of said video file.

14. The computer program product of claim 9, wherein said method further comprises:

detecting via said touch screen display, by said processor, a time duration associated with said amount of pressure being applied via said user contact with said specified portion of said progress bar, wherein said identifying is further based on said time duration.

15. The computer program product of claim 9, wherein said method further comprises:

detecting via said touch screen display, by said processor, a second amount of pressure being applied via said user contact with said specified portion of said progress bar, wherein said second amount of pressure differs from said amount of pressure;

presenting based on said second amount of pressure being applied, by said processor to said user via said touch screen display, an additional menu for selecting additional specified attributes of said portion of said video file, wherein said additional specified attributes differ from said specified attributes;

receiving, by said processor from said user via said additional menu, an selection for a second attribute of said additional specified attributes; and presenting, by said processor to said user via said touch screen display, a second thumbnail image associated with said second attribute, wherein said second thumbnail image differs from said thumbnail image.

16. A hardware device comprising a touch screen display and a computer processor coupled to a computer-readable memory unit, said memory unit comprising instructions that when executed by the computer processor implements a video summary visualization and video file presentation technology improvement method comprising:

detecting via said touch screen display, by said processor, user contact with a specified portion of a progress bar of a video file being presented via said touch screen display, wherein said hardware device comprises specialized non-generic hardware and analog, digital, and logic based circuitry comprising proprietary specially designed components including a specialized integrated circuit;

detecting via said touch screen display, by said processor, an amount of pressure being applied via said user contact with said specified portion of said progress bar;

dynamically modifying, by said processor based on said amount of pressure being applied, a dimension of a cursor of said touch screen display;
identifying, by said processor based on said dimension of said cursor, a portion of said video file associated with said specified portion of said progress bar;
detecting, by said processor, a gesture of said user with respect to said hardware device;
adjusting by said processor based on said gesture, a size of said portion of said video file;
presenting based on said amount of pressure being applied and said portion of said video file, by said processor to said user via said touch screen display, a menu for selecting specified attributes of said portion of said video file;
receiving, by said processor from said user via said menu, a selection for a first attribute of said specified attributes;
overlaying, by said processor, information associated with said first attribute over said progress bar;
presenting, by said processor to said user via said touch screen display, said information over said progress bar;
presenting, by said processor to said user via said touch screen display, a thumbnail image associated with said first attribute, wherein said thumbnail image comprises key characters comprising facial images of individuals presented in said portion of said video file;
stitching, by said processor, said thumbnail image together with a graphical menu summarizing graphical, audible, character, and sematic attributes of said portion of said video file;
receiving, by said processor from said user via said menu, a selection for a second attribute of said specified attributes; and
presenting, by said processor via said touch screen display based on said selection of said second attribute, a graphical summary comprising a first facial image of said facial images and an associated common connection to a second facial image of said facial images, wherein said associated common connection comprises audio, video, and semantic based subject matter connections between said first facial image and said second facial image of said portion of said video file, wherein said subject matter connections are presented as a visible connection line extending between said first facial image and said second facial image, and wherein said graphical summary is presented within said touch screen display such that said graphical summary is presented over a portion of said touch screen display that is less than an entire portion of said touch screen display.

17. The hardware device of claim 16, wherein said thumbnail image is presented adjacent to said progress bar and a point of said user contact.

18. The hardware device of claim 16, wherein said amount of pressure is applied to said specified portion of said progress bar via a first finger of said user, and wherein said selection for said first attribute is enabled via usage of a second finger of said user.

* * * * *